United States Patent
Tsutsui

(10) Patent No.: US 11,159,698 B2
(45) Date of Patent: Oct. 26, 2021

(54) IMAGE PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Junpei Tsutsui, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/998,505

(22) Filed: Aug. 20, 2020

(65) Prior Publication Data

US 2021/0289106 A1 Sep. 16, 2021

(30) Foreign Application Priority Data

Mar. 12, 2020 (JP) .............................. JP2020-042863

(51) Int. Cl.
*H04N 1/60* (2006.01)
*G06N 20/00* (2019.01)
*H04N 1/62* (2006.01)

(52) U.S. Cl.
CPC ........... *H04N 1/6016* (2013.01); *G06N 20/00* (2019.01); *H04N 1/6008* (2013.01); *H04N 1/62* (2013.01)

(58) Field of Classification Search
CPC ....... H04N 1/6016; H04N 1/62; H04N 1/6008
See application file for complete search history.

(56) References Cited

U.S. PATENT DOCUMENTS

| | | | | |
|---|---|---|---|---|
| 5,264,946 | A * | 11/1993 | Takakura | H04N 1/6011 358/466 |
| 7,706,034 | B2 * | 4/2010 | Monga | G09G 5/06 358/520 |
| 8,055,070 | B2 * | 11/2011 | Bassi | H04N 9/3185 382/167 |
| 10,397,483 | B2 * | 8/2019 | Sakai | H04N 1/6058 |
| 10,499,047 | B2 * | 12/2019 | Sakai | H04N 9/735 |
| 2002/0047848 | A1 * | 4/2002 | Odagiri | H04N 1/6033 345/581 |
| 2004/0021882 | A1 * | 2/2004 | Kakutani | H04N 1/6019 358/1.9 |
| 2007/0285694 | A1 * | 12/2007 | Horita | H04N 1/603 358/1.9 |
| 2009/0315911 | A1 * | 12/2009 | Ohnishi | H04N 1/622 345/593 |

(Continued)

FOREIGN PATENT DOCUMENTS

JP 2019-062483 A 4/2019

*Primary Examiner* — Ted W Barnes
(74) *Attorney, Agent, or Firm* — Oliff PLC

(57) ABSTRACT

An image processing apparatus includes a processor. The processor is configured to execute a program to generate a post-color conversion image from a pre-color conversion image using a color conversion model, calculate a color conversion precision of the post-color conversion image using a precision of the color conversion model, specify a region, the color conversion precision of which is equal to or less than a threshold, and display, of the post-color conversion image, a post-color conversion image, the region of which with the color conversion precision being equal to or less than the threshold has a size that is larger than a criterion determined in advance.

20 Claims, 5 Drawing Sheets

(56) References Cited

U.S. PATENT DOCUMENTS

| | | | |
|---|---|---|---|
| 2013/0021628 A1* | 1/2013 | Nakamura | H04N 1/6055 358/1.9 |
| 2013/0250322 A1* | 9/2013 | Kawabata | H04N 1/6055 358/1.9 |
| 2013/0321873 A1* | 12/2013 | Ido | G06K 15/1878 358/3.27 |
| 2019/0098218 A1* | 3/2019 | Sakai | G06T 7/0004 |
| 2019/0098292 A1* | 3/2019 | Sakai | H04N 1/62 |

* cited by examiner

FIG. 4

| INPUT RGB | OUTPUT RGB | PRECISION FOR EACH OF RGB VALUES (IN RANGE OF 0 TO 10) |
|---|---|---|
| (0, 0, 0) | (0, 0, 5) | 8 |
| (0, 0, 1) | (0, 0, 6) | 9 |
| (0, 0, 2) | (0, 0, 8) | 9 |
| ... | ... | ... |
| (80, 0, 254) | (46, 5, 253) | 6 |
| (80, 0, 255) | (50, 5, 254) | 6 |
| ... | ... | ... |
| (255, 255, 254) | (252, 252, 254) | 1 |
| (255, 255, 255) | (255, 255, 255) | 1 |

FIG. 5

| 1 | 1 | 1 | 1 | 2 |
|---|---|---|---|---|
| 2 | 3 | 2 | 2 | 2 |
| 5 | 6 | 7 | 7 | 7 |
| 4 | 4 | 2 | 2 | 1 |
| 5 | 5 | 5 | 5 | 5 |

AVERAGE ⇨ 3.44

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-042863 filed Mar. 12, 2020.

BACKGROUND

(i) Technical Field

The present disclosure relates to an image processing apparatus and a non-transitory computer readable medium.

(ii) Related Art

There are an increasing number of users who capture and view digital images because of the widespread use of devices such as digital cameras, smartphones, and tablets. Various subjects are captured in the images in various environments under the influence of illumination light etc. Thus, the captured images are often different from what the users intended.

Thus, the color tint etc. of the captured images is occasionally changed.

Japanese Unexamined Patent Application Publication No. 2019-062483 describes an image processing apparatus that is capable of quantitatively evaluating a color conversion model. The apparatus includes: a first image acquisition unit and a third image acquisition unit that receive a set of image information composed of information on pre-color conversion images and information on post-color conversion images; an image information acquisition unit that outputs the precision of color conversion characteristics from the received set of information on the plurality of images; and a second precision evaluation display unit that performs control so as to display the output precision on a display device for each color region.

SUMMARY

In the case where a user checks the quality of post-color conversion images, it is necessary to check the post-color conversion images one by one, which requires an enormous amount of work as the number of post-color conversion images increases.

Aspects of non-limiting embodiments of the present disclosure relate to providing a technique of reducing the number of man-hours required to check post-color conversion images in the case where color conversion is performed on images using a model obtained through machine learning, compared to the case where all the images that have been subjected to color conversion are checked.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor, in which the processor is configured to execute a program to generate a post-color conversion image from a pre-color conversion image using a color conversion model, calculate a color conversion precision of the post-color conversion image using a precision of the color conversion model, specify a region where the color conversion precision is equal to or less than a threshold, and display, among post-color conversion images, a post-color conversion image in which the region where the color conversion precision is equal to or less than the threshold has a size that is larger than a criterion determined in advance.

BRIEF DESCRIPTION OF THE DRAWINGS

An exemplary embodiment of the present disclosure will be described in detail based on the following figures, wherein:

FIG. 4 illustrates a three-dimensional LUT and the precision of a color conversion model according to the exemplary embodiment;

FIG. 5 illustrates calculation of the precision of color conversion for each block according to the exemplary embodiment;

DETAILED DESCRIPTION

Figure 1:
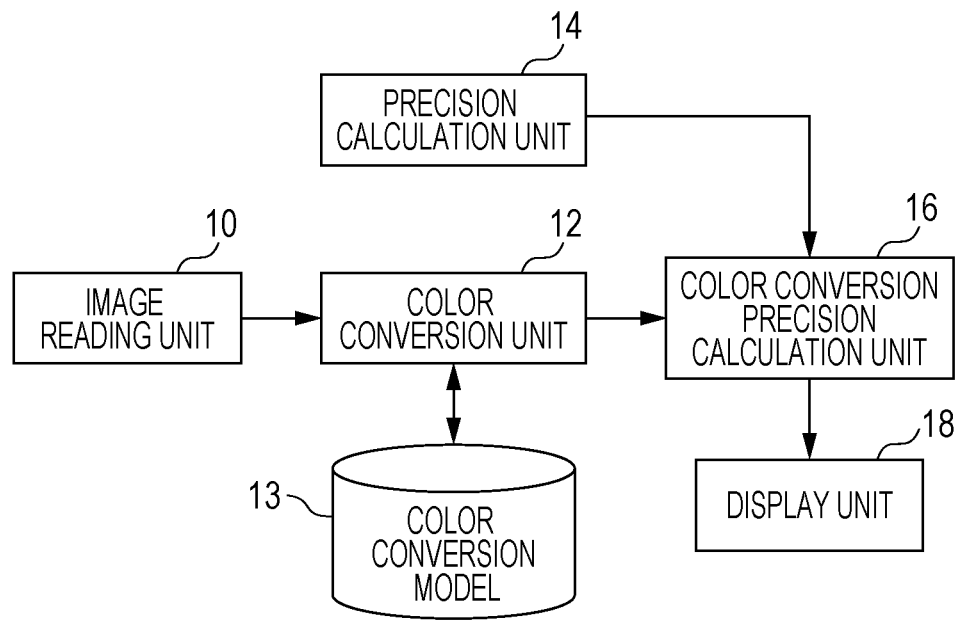
FIG. 1 is a functional block diagram according to an exemplary embodiment.

An exemplary embodiment of the present disclosure will be described below with reference to the drawings.

<Basic Principle>

First, the basic principle of the present exemplary embodiment will be described.

Color conversion on an image may be automatically executed by using a learned color conversion model obtained through machine learning of a color conversion model performed using, as teacher data, a plurality of image data that have been subjected to color conversion performed by a user who is proficient in color conversion work, for example.

The "color conversion model" indicates the relationship between information on pre-color conversion images and information on post-color conversion images. The "color conversion model" may be expressed as a function that represents the relationship between the information on pre-color conversion images and the information on post-color conversion images. When color conversion vectors that have the information on pre-color conversion images as the start point and that have the information on post-color conversion images as the end point are considered, the "color conversion model" is a collection of such color conversion vectors (color conversion vector group). For example, in the case where the image information is RGB data which are composed of red (R), green (G), and blue (B), and when the information on pre-color conversion images is defined as (Ra, Ga, Ba) and the information on post-color conversion images is defined as (Rb, Gb, Bb), the "color conversion model" represents the relationship between (Ra, Ga, Ba) and (Rb, Gb, Bb).

It should be noted, however, that images that have been subjected to color conversion performed using a color conversion model obtained through machine learning are not necessarily subjected to color conversion intended by the user. For example, while the user intends to perform color conversion so as to make the sky as the background bluer, the color of the sky in an image that has been subjected to color conversion performed using a color conversion model obtained through machine learning may be different from the blue color intended by the user. In another example, the color of a subject, e.g. a person, that the user is particularly interested in may be different from the color intended by the user.

Thus, in the present exemplary embodiment, the color conversion precision of post-color conversion images is quantitatively evaluated utilizing the precision of a color conversion model obtained through machine learning, and images with a color conversion precision that is equal to or less than a threshold set in advance are extracted and provided to a user.

The terms "precision of a color conversion model" and "color conversion precision of a post-color conversion image", which are used herein, differ from each other as defined below.

The "precision of a color conversion model" is the precision of the color conversion model itself, and the precision of teacher data used in machine learning performed to generate the color conversion model. The teacher data are constituted from a plurality of pairs of a pre-color conversion image and a post-color conversion image. The precision of such pairs determines the precision of the color conversion model. Specifically, the precision of pairs in which a person proficient in color conversion is involved is high, while the precision of pairs in which a person who is not so proficient is involved is relatively low. In general, a color conversion model is generated as a rule or a correlation for converting a certain color (R, G, B) into a different color (r, g, b). Thus, the precision of a color conversion model may also be determined for each color (R, G, B).

Meanwhile, the "color conversion precision of a post-color conversion image" is the color conversion precision of an image itself that has been subjected to color conversion performed using a color conversion model. The color conversion precision of a post-color conversion image is inevitably determined in accordance with the precision of a color conversion model, since the image has been subjected to color conversion performed using the color conversion model. The color of pixels in a pre-color conversion image is converted into the color of pixels in a post-color conversion image using the color conversion model. Thus, the color conversion precision of a post-color conversion image may be determined for each of the pixels in the post-color conversion image. The color conversion precision of a post-color conversion image may be expressed as a statistical value of the precision for each of the pixels. Specifically, a post-color conversion image is divided into a plurality of blocks, and the color conversion precision for each block may be expressed as an average value of the precisions of a group of pixels that constitute the block. As a matter of course, an average value is an example of the statistical value, and the present disclosure is not limited thereto. Other statistical values such as a mode value, a minimum value, and a maximum value, for example, may also be adopted.

The present exemplary embodiment will be specifically described below.

<Configuration>

FIG. 1 is a functional block diagram of an image processing apparatus according to the present exemplary embodiment. The image processing apparatus includes an image reading unit 10, a color conversion unit 12 that performs color conversion using a color conversion model, a precision calculation unit 14 that calculates the precision of the color conversion model, a color conversion precision calculation unit 16, and a display unit 18.

The image reading unit 10 reads an image to be subjected to color conversion. The image reading unit 10 supplies the read image to the color conversion unit 12. The image reading unit 10 may be a scanner that converts an image printed on a document into digital data, or may be a communication interface to which digital image data are input from an external server etc. via a communication line.

The color conversion unit 12 executes color conversion on an input image using a color conversion model 13, and outputs the resulting image as a post-color conversion image. The color conversion model 13 is a color conversion model obtained through machine learning performed using a plurality of pairs of a pre-color conversion image and a post-color conversion image as teacher data. More particularly, the color conversion unit 12 prepares a conversion relationship for performing color conversion of image information on original pre-color conversion images into image information on post-color conversion images on the basis of the color conversion model 13. The "conversion relationship" indicates conversion information for converting the information on pre-color conversion images into the information on post-color conversion images. The conversion relationship may be prepared as a look-up table (LUT). The LUT may be a multi-dimensional LUT. Alternatively, the LUT may be a one-dimensional LUT. The conversion relationship may be prepared as a multi-dimensional matrix, rather than an LUT.

The conversion relationship is information for converting, in the case where the image information is RGB data, the information on pre-color conversion images (Ra, Ga, Ba) into the information on post-color conversion images (Rb, Gb, Bb) as follows:

(Ra, Ga, Ba)→(Rb, Gb, Bb)

The use of this conversion relationship allows reproduction of color conversion that is similar to the color conversion performed previously. That is, when there occurs new information on pre-color conversion images, information on post-color conversion images may be generated by performing color conversion that is similar to the color conversion performed previously by performing color conversion using the conversion relationship.

In the case where the conversion relationship is a multi-dimensional LUT, the conversion relationship is a three-dimensional LUT, and directly converts (Ra, Ga, Ba) into (Rb, Gb, Bb). That is, the conversion relationship performs the following conversion:

(Ra, Ga, Ba)→(Rb, Gb, Bb)

In the case where the conversion relationship is a one-dimensional LUT, meanwhile, the conversion relationship performs conversion for each of R, G, and B. That is, the conversion relationship performs the following conversions:

Ra→Rb
Ga→Gb
Ba→Bb

While conversion is performed in the RGB color space in the present exemplary embodiment, conversion may be performed in a different color space such as the CMYK color space. In this case, the image information is CMYK data which are composed of cyan (C), magenta (M), yellow (Y), and black (K). In the case where the conversion relationship is a multi-dimensional LUT, the conversion relationship is a four-dimensional LUT, and converts the information on pre-color conversion images (Ca, Ma, Ya, Ka) into the information on post-color conversion images (Cb, Mb, Yb, Kb) as follows:

(Ca, Ma, Ya, Ka)→(Cb, Mb, Yb, Kb)

In the case where the conversion relationship is a one-dimensional LUT, meanwhile, the conversion relationship performs conversion for each of C, M, Y, and K. That is, the conversion relationship performs the following conversions:

Ca→Cb
Ma→Mb
Ya→Yb
Ka→Kb

The precision calculation unit 14 quantitatively calculates the model precision of the color conversion model 13. The color conversion model 13 is generated through machine learning performed using a plurality of pairs of information on a pre-color conversion image and information on a post-color conversion image corresponding thereto as teacher data. Therefore, it is necessary to acquire teacher data. At this time, if the precision of the plurality of pairs of information on a pre-color conversion image and information on a post-color conversion image is low, a color conversion model with a high precision may not be prepared, which reduces the precision of the conversion relationship. Specifically, data with different directionality of color conversion are occasionally mixed into teacher data in performing color conversion, and such data may reduce the precision of a color conversion model derived from a plurality of pairs of images. This may be caused in the case where there is a problem with the level of proficiency of the user who performs color conversion, in the case where the environment in which color conversion is performed is different, etc., for example. Examples of the difference in the environment include a difference in the device characteristics of a display device being used and a difference in the lighting environment. If data with different directionality of color conversion are mixed into teacher data, the uniformity in directionality of color conversion may be degraded, which makes it difficult to prepare a color conversion model with a high precision. When color conversion is performed using the prepared conversion relationship, color conversion may be performed differently from the intention of the user, or color conversion may be performed with a small amount of variations with the magnitude of color conversion reduced.

The "precision" of a plurality of pairs of information on a pre-color conversion image and information on a post-color conversion image is an index that indicates whether or not the directionality of color conversion is consistent. The "precision" may also be considered as an index that indicates the level of quality of a plurality of pairs of information on a pre-color conversion image and information on a post-color conversion image for preparing a color conversion model or conversion relationship. The "precision" may be quantitatively evaluated by digitizing color conversion on the basis of color conversion vectors that have information on pre-color conversion images as the start point and that have information on post-color conversion images as the end point. The "precision" may be determined for all the plurality of pairs of images, on the basis of which a color conversion model is prepared, or may be determined for some of the plurality of pairs of images, on the basis of which a color conversion model is prepared.

In this manner, the precision calculation unit 14 calculates the precision of the color conversion model 13 on the basis of color conversion vectors that have information on pre-color conversion images as the start point and that have information on post-color conversion images as the end point. Specifically, as described in Japanese Unexamined Patent Application Publication No. 2019-062483, for example, the precision is calculated from the angle between a plurality of color conversion vectors. When the color conversion vectors are defined as a color conversion vector Vc1 and a color conversion vector Vc2, the start point of the color conversion vectors Vc1 and Vc2 means information (color value) on pre-color conversion images, and the end point of such vectors means information (color value) on post-color conversion images. That is, the color conversion vectors Vc1 and Vc2 indicate the direction and the amount of movement of images due to color conversion. Focus is placed on an angle θ between the color conversion vector Vc1 and the color conversion vector Vc2. In the case where the directionality of color adjustment is consistent and uniform in a specific color region, the directions of a plurality of color conversion vectors are consistent, and therefore the angle θ tends to be closer to 0. In the case where the directionality of color adjustment is not consistent and less uniform, on the contrary, the directions of a plurality of color conversion vectors do not tend to be consistent, and the angle θ tends to be larger. That is, the angle θ between a plurality of color conversion vectors tends to be smaller in the case where the precision for a plurality of pairs of images is high, and the angle θ between a plurality of color conversion vectors tends to be larger in the case where the precision is low. Thus, the precision may be calculated from the angle θ between a plurality of color conversion vectors. The precision of a color conversion model may be calculated for each color region or each of R, G, and B. The precision which is calculated by the precision calculation unit 14 is used by the color conversion precision calculation unit 16 to calculate the precision of color-converted images as discussed later. Thus, it is desirable that the precision calculation unit 14 should calculate the precision in a manner that matches the method of color conversion. For example, in the case where color conversion is executed using a three-dimensional LUT, the precision may be calculated for each conversion rule of the LUT. More specifically, in the case where the LUT performs conversion as (Ra, Ga, Ba)→(Rb, Gb, Bb), the precision for this conversion rule is calculated as (Ra, Ga, Ba)→(Rb, Gb, Bb): precision a.

Alternatively, the precision calculation unit 14 may calculate the precision from the color difference at the end point of a plurality of color conversion vectors. The color conversion vectors are defined as a color conversion vector Vc3 and a color conversion vector Vc4, and a difference (color difference) L in image information at the end point between the color conversion vector Vc3 and the color conversion vector Vc4 is considered. The color difference L may also be considered as a Euclidean distance in a color space (e.g. RGB color space) that represents the image information. In the case where the directionality of color conversion is consistent and uniform in a specific color region, the color conversion vectors Vc3 and Vc4 are consistent with each other in direction and magnitude, and therefore the respective positions of the end points of such color conversion vectors do not tend to be varied. As a result, the color difference L tends to be smaller. In the case where the directionality of color conversion is not consistent and less uniform, on the contrary, the color conversion vectors Vc3 and Vc4 do not tend to be consistent with each other in direction and magnitude, and the respective positions of the end points of such color conversion vectors tend to be varied. As a result, the color difference L tends to be larger. That is, the color difference at the end point between the color conversion vectors Vc3 and Vc4 tends to be smaller in the case where the precision for a plurality of pairs of images is high, and the color difference at the end point between the color conversion vectors Vc3 and Vc4 tends to be larger in the case where the precision is low. Hence, the precision may be calculated from the color difference at the end point between the color conversion vectors Vc3 and Vc4.

The precision calculation unit 14 supplies the calculated precision of the color conversion model to the color conversion precision calculation unit 16.

The color conversion precision calculation unit 16 calculates the color conversion precision of a post-color conversion image performed by the color conversion unit 12 using the color conversion model on the basis of the precision of the color conversion model which is calculated by the precision calculation unit 14. The color conversion precision of a post-color conversion image is the color conversion precision for the entirety or a part of the post-color conversion image. The precision for the entirety of the post-color conversion image is calculated through statistical processing of the precision for each pixel of the post-color conversion image for the entire image, for example. Meanwhile, the precision for a part of the post-color conversion image is calculated through statistical processing of the precision for each pixel that constitutes a specific region or a region of interest of the post-color conversion image, for example. The color conversion precision calculation unit 16 outputs the calculated precision of the post-color conversion image to the display unit 18, together with or separately from the post-color conversion image.

The display unit 18 displays the post-color conversion image and the precision of the post-color conversion image to be presented to the user. The display unit 18 may sequentially display the precisions of post-color conversion images, or may compare the precisions of post-color conversion images with a threshold and selectively display only images with a precision that is low enough to be equal to or less than the threshold. In particular, the display unit 18 preferably compares the precision of post-color conversion images with a threshold and selectively displays only post-color conversion images, the size of a region of which with a precision that is equal to or less than the threshold is larger than a criterion determined in advance.

Figure 2:
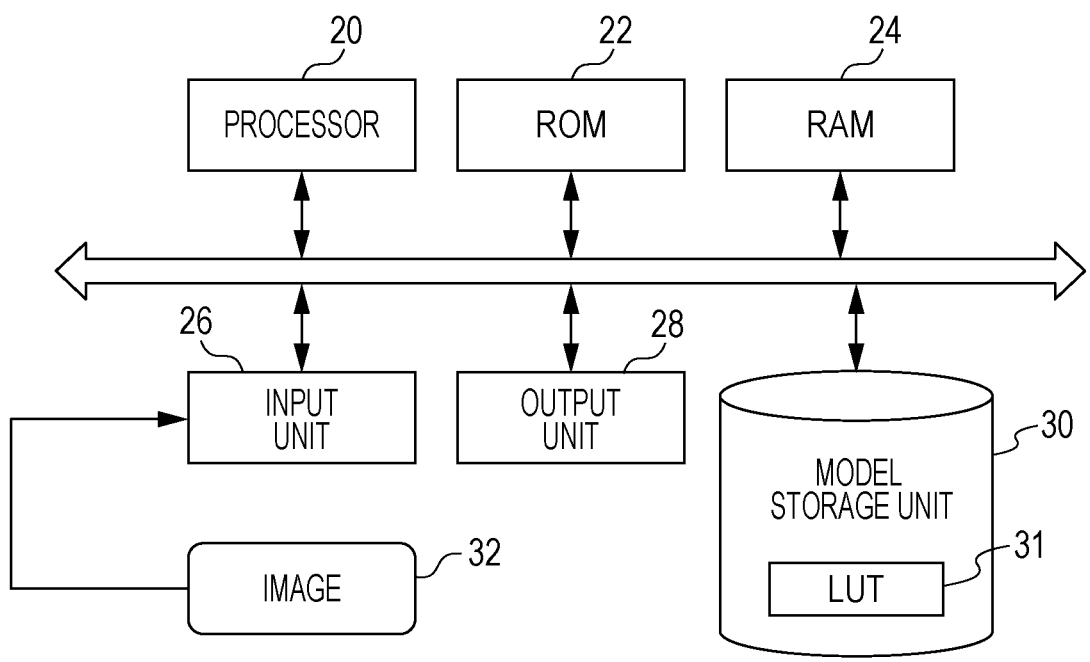
FIG. 2 is a configuration block diagram according to the exemplary embodiment.

FIG. 2 is a block diagram illustrating the configuration of the image processing apparatus according to the present exemplary embodiment.

The image processing apparatus is constituted of a computer, and includes a processor 20, a read only memory (ROM) 22, a random access memory (RAM) 24, an input unit 26, an output unit 28, and a model storage unit 30.

The processor 20 implements a color conversion process, a process of calculating the precision of a color conversion model, and a process of calculating the precision of color conversion by reading a process program stored in the ROM 22 or a different program memory and executing the process program using the RAM 24 as a work memory. The program 20 executes the color conversion process using the color conversion model 13 which is stored in the model storage unit 30 in advance when an image 32 to be subjected to color conversion is input. The color conversion model 13 may be a three-dimensional LUT 31, for example, and prescribe the conversion relationship between (Ra, Ga, Ba) and (Rb, Gb, Bb). The processor 20 performs color conversion of a color component (Ra, Ga, Ba) that constitutes a pre-color conversion image using the three-dimensional LUT 31 which is stored in the model storage unit 30, as follows:

(Ra, Ga, Ba)→(Rb, Gb, Bb)

In addition, the processor 20 calculates the precision of a color conversion model on the basis of color conversion vectors that have pre-color conversion images as the start point and that have post-color conversion images as the end point. For example, the processor 20 calculates the precision from the angle between a plurality of color conversion vectors or the color difference at the end point between the color conversion vectors, for example. The processor 20 calculates the precision of a color conversion model for each of R, G, and B, and calculates the precision as a relative precision normalized to the range of 0 to 10, for example. Specifically, in the case where the three-dimensional LUT 31 performs color conversion as (0,0,0)→(0,0,5), the precision of the color conversion model may be normalized to the range of 0 to 10 and calculated as "8", for example.

In addition, the processor 20 calculates the color conversion precision of a post-color conversion image from the precision of the color conversion model 13 and color-converted images. Since the precision of the color conversion model is calculated for each of R, G, and B, the color conversion precision is calculated for each pixel of the post-color conversion image. The processor 20 calculates the color conversion precision for the entirety or a part of the post-color conversion image using the color conversion precision for each pixel of the post-color conversion image.

Further, the processor 20 compares the calculated color conversion precision of a post-color conversion image with a first threshold set in advance, and specifies an image region, the color conversion precision of which is low enough to be equal to or less than the first threshold. The processor 20 compares the size of the image region, the color conversion precision of which is low enough to be equal to or less than the first threshold, with a second threshold set in advance, and selects a post-color conversion image that has an image region that is large enough to be equal to or more than the second threshold.

The input unit 26 is constituted from a scanner, a communication interface, etc., and receives the image 32 which is input thereto.

The output unit 28 is constituted from a display, a communication interface, etc., and outputs the result of processing by the processor 20, that is, a post-color conversion image in which an image region, the color conversion precision of which is equal to or less than the first threshold, has a size that is equal to or more than the second threshold.

The model storage unit 30 stores the color conversion model 13 which has been learned. While the color conversion model 13 is specifically the three-dimensional LUT 31 etc., the color conversion model 13 may also be a one-dimensional LUT.

The processor 20 refers to hardware in a broad sense. Examples of the processor 20 include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). The term "processor" is broad enough to encompass one processor or plural processors in collaboration which are located physically apart from each other but may work cooperatively. The order of operations of the processor is not limited to one described herein, and may be changed.

<Process Flowchart>

Figure 3:
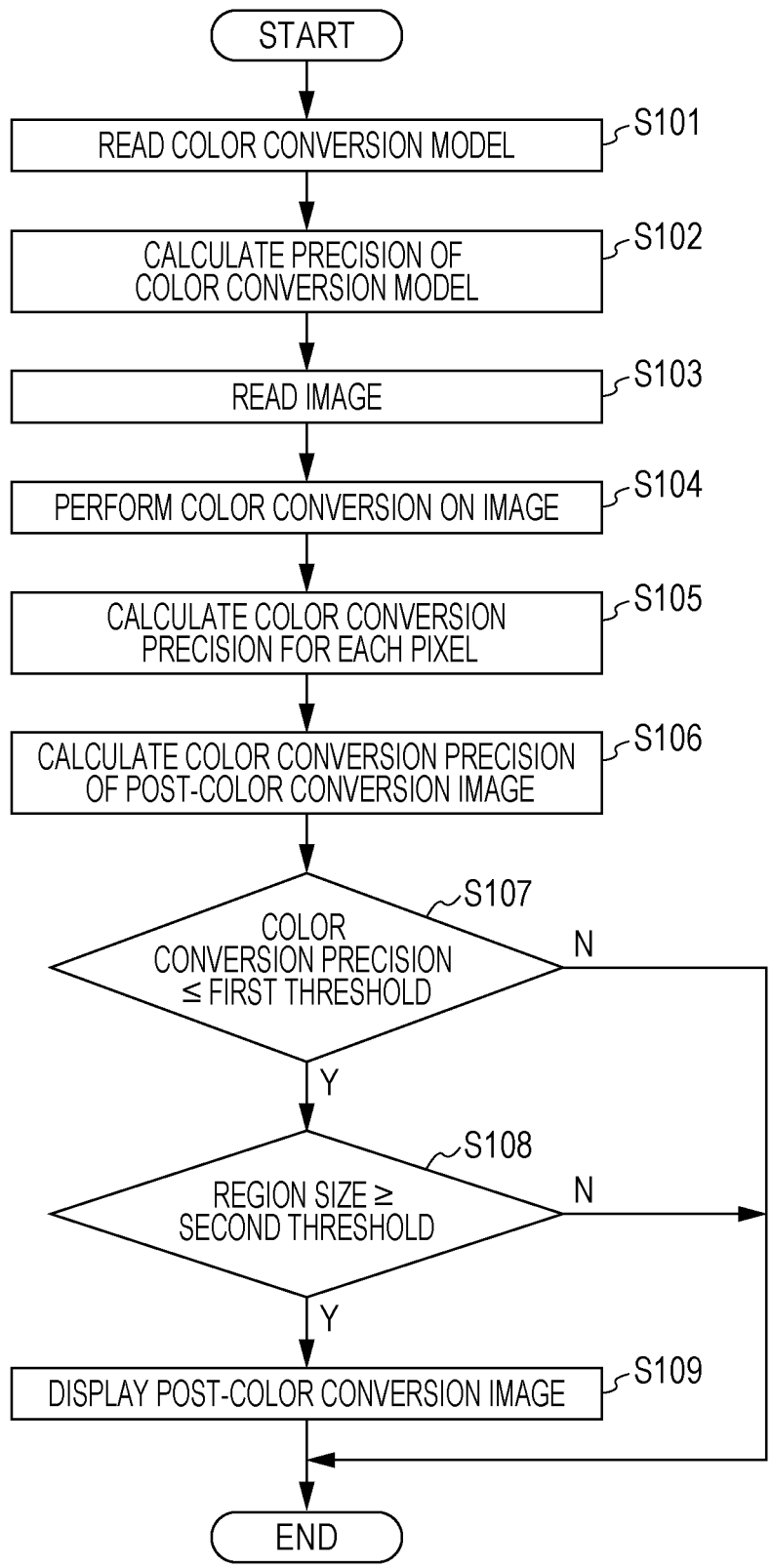
FIG. 3 is a process flowchart according to the exemplary embodiment.

FIG. 3 is a process flowchart according to the exemplary embodiment.

First, the processor 20 reads the color conversion model 13 which is stored in the model storage unit 30 (S101). In the case where the color conversion model 13 is the three-dimensional LUT 31, the three-dimensional LUT 31 is read and developed in the RAM 24.

Next, the processor 20 calculates the precision of the color conversion model 13 (S102). In the case where the color conversion model 13 is the three-dimensional LUT 31, the precision of the color conversion model 13 is calculated by calculating the conversion precision for all the correlation of the three-dimensional LUT 31.

Next, the processor 20 reads the image 32 to be subjected to color conversion from the input unit 26 (S103), and executes color conversion on the read image using the color conversion model 13 (S104). That is, color conversion is performed on the R, G, and B values of the read image on the basis of the three-dimensional LUT 31 as follows:

(Ra, Ga, Ba)→(Rb, Gb, Bb)

Next, the processor 20 calculates the color conversion precision for each pixel of the post-color conversion image (S105). Since the conversion precision is calculated for all the correlation of the three-dimensional LUT 31 in S102, the processor 20 calculates the color conversion precision for each pixel of the post-color conversion image using the conversion precision. For example, the precision is calculated as "8" for a certain pixel of the post-color conversion image, the precision is calculated as "9" for a different pixel of the post-color conversion image, etc. The processor 20 calculates the color conversion precision for all the pixels of the post-color conversion image.

Next, the processor 20 calculates the color conversion precision for the post-color conversion image using the color conversion precision which is calculated for each pixel (S106). Specifically, the post-color conversion image is divided into a plurality of blocks, and the color conversion precision for each block is calculated as an average of the color conversion precisions of a group of pixels that constitute the block. The size of the blocks may be determined as desired, and may be set to five pixels by five pixels, for example. However, the present disclosure is not limited thereto.

Next, the processor 20 compares the color conversion precision which is calculated for each block of the post-color conversion image with the first threshold which is set in advance (S107). In the case where the color conversion precision for the block is low enough to be equal to or less than the first threshold (YES in S107), the size of the region of all such blocks, that is, the region of all the blocks, the color conversion precision of which is determined to be equal to or less than the first threshold, is compared with the second threshold which is set in advance (S108). In the case where the size of the region of all the blocks, the color conversion precision of which is equal to or less than the first threshold, is equal to or more than the second threshold (YES in S108), the processor 20 displays the post-color conversion image as an image with a low color conversion precision as a whole (S109).

When the image with a low color conversion precision is displayed in S109, the processor 20 may display the blocks with a color conversion precision determined to be equal to or less than the first threshold in S107, that is, the region with a relatively low color conversion precision, in a highlighted manner, as surrounded by a frame, etc.

While the processor 20 compares the color conversion precision which is calculated for each block of the post-color conversion image with the first threshold in S107, the processor 20 may compare the color conversion precision for each pixel of the post-color conversion image with the first threshold. In this case, in S108, the size of the region of all the pixels, the color conversion precision of which is determined to be equal to or less than the first threshold, may be compared with the second threshold.

<LUT and Precision of Color Conversion Model>

FIG. 4 is a table 34 that indicates an example of the three-dimensional LUT 31 which is stored in the model storage unit 30 and the precision for all the correlation of the LUT 31 which is calculated by the processor 20. When the precision is calculated for all the correlation of the LUT 31, the processor 20 stores the calculated precision in the model storage unit 30 in correlation with the LUT 31 which is stored in the model storage unit 30.

As discussed already, the LUT 31 is a table that prescribes the following conversion:

(Ra, Ga, Ba)→(Rb, Gb, Bb)

Specifically, color conversion is performed as follows:

(0,0,0)→(0,0,5)
(0,0,1)→(0,0,6)
(255,255,254)→(252,252,254)
(255,255,255)→(255,255,255)
etc.

The processor 20 calculates the precision for each correlation. Specifically, the precision is calculated as follows:

(0,0,0)→(0,0,5): 8
(0,0,1)→(0,0,6): 9
(80,0,255)→(50,5,254): 6
(255,255,254)→(252,252,254): 1
(255,255,255)→(255,255,255): 1
etc.

The precision is a relative value normalized to the range of 0 to 10. Since the precision is calculated for each of R, G, and B, the precision of a pixel of interest of the post-color conversion image is calculated on the basis of the R, G, and B values of the pixel of interest.

<Color Conversion Precision for Each Block>

FIG. 5 schematically illustrates an example in which a post-color conversion image is divided into a plurality of blocks and the color conversion precision is calculated for each of the blocks.

A block 36 is constituted from five pixels by five pixels, for example, and the precision of the color conversion model is calculated for each of the pixels that constitute the block 36. In FIG. 5, numerals "1", "2", "3", etc. indicate the precision of the corresponding pixels. The color conversion precision for the block 36 is calculated by averaging the precisions for all the pixels that constitute the block 36. In this case, the color conversion precision is calculated as follows:

$$(1+1+\ldots+5)/25=3.44$$

When the blocks that constitute a post-color conversion image are defined as Bi and the average precision of the blocks Bi is defined as ai, the color conversion precision for all the blocks of the post-color conversion image is calculated as follows:

B1: a1
B2: a2
Bn: an

The processor 20 determines a group of color conversion precisions ai which is calculated for each of the blocks Bi as the color conversion precision for the entire post-color conversion image. The color conversion precision ai which is calculated for each of the blocks Bi is compared with a first threshold and a second threshold. If the size of all the blocks Bi, the color conversion precision ai of which is equal to or less than the first threshold, is equal to or more than the second threshold, the post-color conversion image is displayed and presented to the user. For example, if the blocks Bi, the precision ai of which is equal to or less than the first threshold, include B1, B2, B3, and B4 and a block size (B1+B2+B3+B4) obtained by adding such blocks is equal to or more than the second threshold, the post-color conversion image is displayed. In general, when the first threshold is defined as Th1 and the second threshold is defined as Th2, the post-color conversion image is displayed if:

(1) ai≤Th1 and (2) ΣBi≥Th2

<First Modification>

In the present exemplary embodiment, a region of interest in an image may be specified from a post-color conversion image using a subject detection technique etc., and a color conversion precision may be calculated for only the region of interest. This is because the user is considered to pay particular attention to the color conversion precision of the region of interest. Alternatively, a color conversion precision may be calculated with a weight given to the region of interest. In other words, the degree of contribution of the region of interest to the color conversion precision is relatively increased, and the degree of contribution of a region of no interest to the color conversion precision is relatively reduced.

Figure 6:
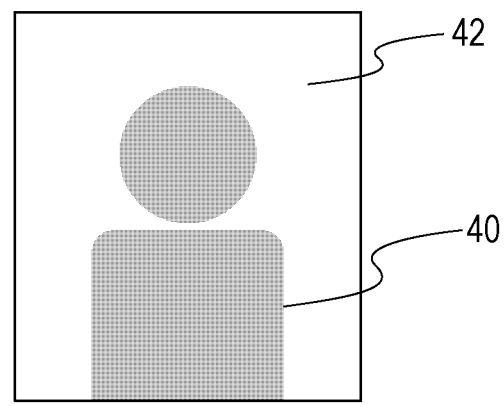
FIG. 6 illustrates a region of interest and a region of no interest according to a modification.

FIG. 6 schematically illustrates a process for this case. A person 40 as a subject and the remaining background 42 are detected from a post-color conversion image. The person 40 is the principal subject, and is specified as a region of interest.

When the person 40 is detected from the post-color conversion image, the processor 20 calculates a color conversion precision for only the blocks that constitute the person 40. The color conversion precision for the blocks that constitute the person 40 is compared with a first threshold, and the size of all the blocks, the color conversion precision of which is equal to or less than the first threshold, is compared with a second threshold. If the size of all the blocks, the color conversion precision of which is equal to or less than the first threshold, is equal to or more than the second threshold, the post-color conversion image is displayed as an image with a low color conversion precision. It should be noted that the color conversion precision for the blocks that constitute the background 42 is not involved in this process.

When the person 40 is detected from the post-color conversion image, alternatively, the processor 20 calculates a color conversion precision for the blocks that constitute the person 40 and the blocks that constitute the remaining background 42. The color conversion precision for the blocks that constitute the person 40 and the blocks that constitute the background 42 is compared with a first threshold, and the size of all the blocks, the color conversion precision of which is equal to or less than the first threshold, is compared with a second threshold with a relatively large weight given to the blocks that constitute the person 40 compared to the weight given to the blocks that constitute the background 42.

Specifically, if the blocks that constitute the person 40 and the color conversion precision of which is equal to or less than the first threshold are defined as Bmi and the blocks that constitute the background 42 and the color conversion precision of which is equal to or less than the first threshold are defined as Bsi, it is determined whether or not $$p \cdot \Sigma Bmi + q \cdot \Sigma Bsi \geq Th2$$

is met. p and q are weights that meet p>q. If q=0, a color conversion precision is calculated for only the blocks that constitute the person 40 as discussed above.

A relatively large weight may be given to the blocks that constitute the person 40 by comparing the color conversion precision for the blocks that constitute the person 40 with a first threshold and comparing the color conversion precision for the blocks that constitute the background 42 with a third threshold that is smaller than the first threshold. Consequently, the color conversion precision for the blocks that constitute the person 40 is extracted if the color conversion precision is equal to or less than the first threshold, while the color conversion precision for the blocks that constitute the background 42 is not extracted unless the color conversion precision is equal to or less than the third threshold. As a result, the color conversion precision may be relatively sensitive to the blocks that constitute the person 40.

<Second Modification>

In the present exemplary embodiment, a comparison may be made between a pre-color conversion image and a post-color conversion image, a region with a relatively large amount of variations in color conversion may be specified, and a color conversion precision may be calculated for only the region with a relatively large amount of variations. This is because the user is considered to pay particular attention to the color conversion precision of the region with a large amount of variations. Alternatively, a color conversion precision may be calculated with a weight given to the region with a large amount of variations.

Figure 7:
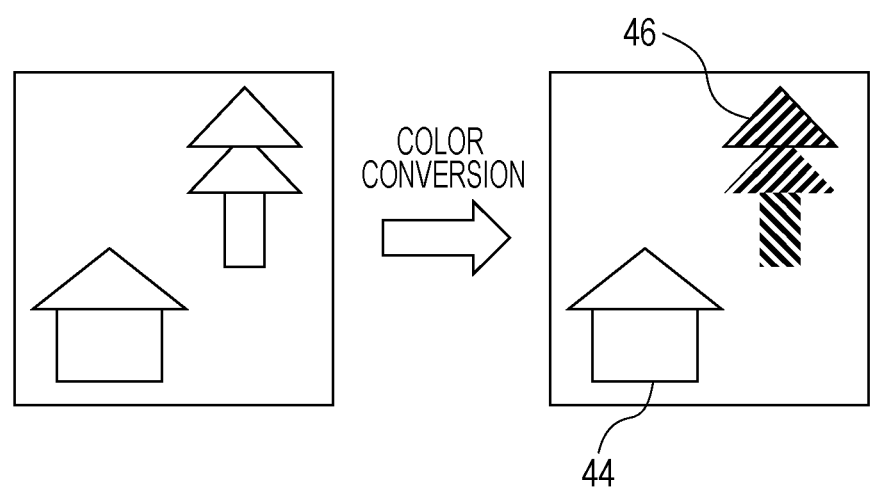
FIG. 7 illustrates a region with a large amount of variations in color conversion and a region with no such variations according to a modification.

FIG. 7 schematically illustrates a process for this case. It is assumed that, in a post-color conversion image, the amount of variations in color conversion is relatively large for a subject 46 and the amount of variations in color conversion is relatively small for a subject 44. The amount of variations in color conversion may be defined as the magnitude of a color conversion vector, and the magnitude of the color conversion vector is compared with a threshold to determine whether or not the amount of variations in color conversion is relatively large. When the subject 46 is detected from the post-color conversion image, the processor 20 calculates a color conversion precision for only the blocks that constitute the subject 46. The color conversion precision for the blocks that constitute the subject 46 is compared with a first threshold, and the size of all the blocks, the color conversion precision of which is equal to or less than the first threshold, is compared with a second threshold. If the size of all the blocks, the color conversion precision of which is equal to or less than the first threshold, is equal to or more than the second threshold, the post-color conversion image is displayed as an image with a low color conversion precision. It should be noted that the color conversion precision for the blocks that constitute the subject 44 is not involved in this process.

Alternatively, the processor 20 calculates a color conversion precision for the blocks that constitute the subject 46 and the blocks that constitute the subject 44. The color conversion precision for the blocks that constitute the subject 46 and the blocks that constitute the subject 44 is compared with a first threshold, and the size of all the blocks, the color conversion precision of which is equal to or less than the first threshold, is compared with a second threshold with a relatively large weight given to the blocks that constitute the subject 46 compared to the weight given to the blocks that constitute the subject 44.

Specifically, if the blocks that constitute the subject 46 and the color conversion precision of which is equal to or less than the first threshold are defined as Bmi and the blocks that constitute the subject 44 and the color conversion precision of which is equal to or less than the first threshold are defined as Bsi, it is determined whether or not $$p \cdot \Sigma Bmi + q \cdot \Sigma Bsi \geq Th2$$

is met. p and q are weights that meet p>q.

It should be noted that, in this modification, a color conversion precision is calculated not for the entire post-color conversion image, but for a part of the post-color conversion image, specifically the blocks that constitute the subject 44 and the subject 46.

<Third Modification>

While a post-color conversion image, of which a region with a color conversion precision that is equal to or less than a first threshold has a size that is equal to or more than a second threshold, is displayed in the present exemplary embodiment, a frame that surrounds the region with a color conversion precision that is equal to or less than the first threshold may be displayed in addition to the image, so as to be easily visually recognizable by the user.

Figure 8:
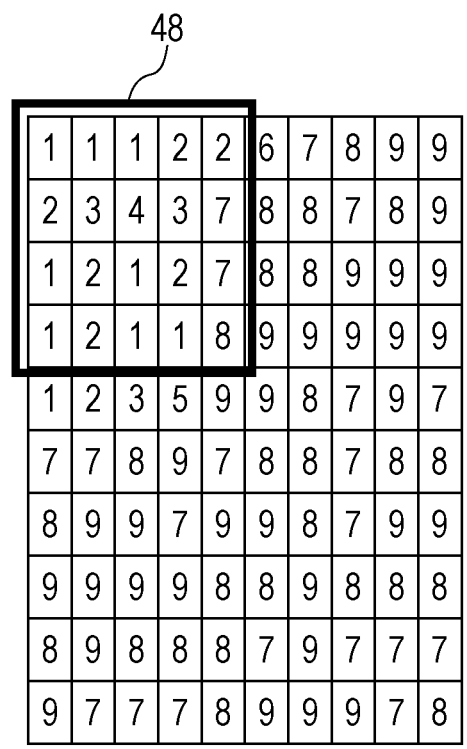
FIG. 8 illustrates a display example according to a modification.

FIG. 8 schematically illustrates a process for this case. A region of the post-color conversion image, the color conversion precision of which is equal to or less than the first threshold, is displayed as surrounded by a red frame 48, for example. In the drawing, numerals "1", "2", . . . etc. given in the pixels indicate the color conversion precision of the pixels. The region with a low color conversion precision may be displayed as trimmed, or displayed as a heat map, rather than being surrounded by the red frame 48.

<Fourth Modification>

While the degree of contribution of a region of interest of a post-color conversion image to the color conversion precision is relatively increased and the degree of contribution of a region of no interest to the color conversion precision is relatively reduced in the first modification, the degree of contribution of a region that is important to the user, of the region of interest, may be relatively increased and the degree of contribution of a region that is not so important may be relatively reduced. Whether or not a region is important may be designated by the user in advance and input using the input unit 26, or may be determined automatically by learning a past user history. In the case where an important region is designated by the user, the following criteria may be used, for example:

a person is designated as important;
a subject in the central region of an image is designated as important;
a subject that occupies the largest area is designated as important; and
a subject in a specific color (such as a skin color) is designated as important.

Figure 9:
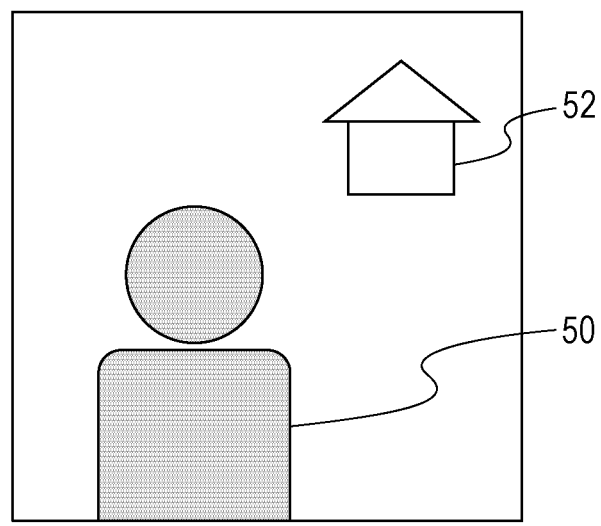
FIG. 9 illustrates an important region and an unimportant region according to a modification.

FIG. 9 schematically illustrates a process for this case. In a post-color conversion image, both a subject 50 and a subject 52 are assumed as regions of interest, the subject 50 is assumed as a subject that is important to the user, and the subject 52 is assumed as a subject that is not relatively important to the user. When the subject 50 is detected from the post-color conversion image, the processor 20 calculates a color conversion precision for only the blocks that constitute the subject 50. The color conversion precision for the blocks that constitute the subject 50 is compared with a first threshold, and the size of all the blocks, the color conversion precision of which is equal to or less than the first threshold, is compared with a second threshold. If the size of all the blocks, the color conversion precision of which is equal to or less than the first threshold, is equal to or more than the second threshold, the post-color conversion image is displayed as an image with a low color conversion precision. The color conversion precision for the blocks that constitute the subject 52 is not involved in this process.

Alternatively, when the subject 50 and the subject 52 are detected from a post-color conversion image, the processor 20 calculates a color conversion precision for the blocks for the subject 50 and the subject 52. The color conversion precision for the blocks that constitute the subject 50 and the blocks that constitute the subject 52 is compared with a first threshold, and the size of all the blocks, the color conversion precision of which is equal to or less than the first threshold, is compared with a second threshold with a relatively large weight given to the blocks that constitute the subject 50 compared to the weight given to the blocks that constitute the subject 52.

The color conversion precision for the important subject 50 may be compared with a third threshold that is smaller than the first threshold. That is, the first threshold for the important subject 50 may be changed to a value that is stricter than that for the subject 52 which is not so important.

While regions of interest are further classified into an important region and an unimportant region in the present modification, a post-color conversion image may be simply divided into an important region and an unimportant region to be processed. In short, a post-color conversion image may be classified into:

(A) a region of interest and a region of no interest;
(B) a region with a large amount of variations in color conversion and a region with a small amount of variations; or
(C) an important region and an unimportant region, and an image with a low color conversion precision may be selected from such regions and displayed by:
(a) varying a weight; or
(b) varying a threshold. The threshold in (b) may be at least one of the first threshold and the second threshold.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor,
wherein the processor is configured to execute a program to
generate a post-color conversion image from a pre-color conversion image using a color conversion model,
calculate a color conversion precision of the post-color conversion image using a precision of the color conversion model,
specify a region where the color conversion precision is equal to or less than a threshold, and
display, among post-color conversion images, a post-color conversion image in which the region where the color conversion precision is equal to or less than the threshold has a size that is larger than a criterion determined in advance.

2. The image processing apparatus according to claim 1, wherein the processor calculates a precision for each of red, green, and blue colors as the precision of the color conversion model, and calculates the color conversion precision for each pixel.

3. The image processing apparatus according to claim 2, wherein the processor divides the post-color conversion image into a plurality of blocks, and calculates the color conversion precision for each of the blocks.

4. The image processing apparatus according to claim 3, wherein the processor calculates a statistical value for a group of pixels that constitute the block as the color conversion precision.

5. The image processing apparatus according to claim 3, wherein the processor calculates the color conversion precision through weighted computation in which, in the post-color conversion image, a relatively large weight is given to a region of interest and a relatively small weight is given to a region of no interest.

6. The image processing apparatus according to claim 3, wherein the processor calculates the color conversion precision through weighted computation in which, in the post-color conversion image, a relatively large weight is given to an important region and a relatively small weight is given to an unimportant region.

7. The image processing apparatus according to claim 3, wherein the processor calculates the color conversion precision through weighted computation in which, in the post-color conversion image, a relatively large weight is given to a region with a relatively large amount of variations in color conversion and a relatively small weight is given to a region with a relatively small amount of variations in color conversion.

8. The image processing apparatus according to claim 2, wherein the processor calculates the color conversion precision through weighted computation in which, in the post-color conversion image, a relatively large weight is given to a region and a relatively small weight is given to a region of no interest.

9. The image processing apparatus according to claim 2, wherein the processor calculates the color conversion precision through weighted computation in which, in the post-color conversion image, a relatively large weight is given to an important region and a relatively small weight is given to an unimportant region.

10. The image processing apparatus according to claim 2, wherein the processor calculates the color conversion precision through weighted computation in which, in the post-color conversion image, a relatively large weight is given to a region with a relatively large amount of variations in color conversion and a relatively small weight is given to a region with a relatively small amount of variations in color conversion.

11. The image processing apparatus according to claim 2, wherein the processor compares the color conversion precision with the threshold using different thresholds for a region of interest and a region of no interest, in the post-color conversion image.

12. The image processing apparatus according to claim 2, wherein the processor compares the color conversion precision with the threshold using different thresholds for an important region and an unimportant region, in the post-color conversion image.

13. The image processing apparatus according to claim 2, wherein the processor compares the color conversion precision with the threshold using different thresholds for a region where an amount of change in color conversion is relatively large and a region where an amount of change in color conversion is relatively small, in the post-color conversion image.

14. The image processing apparatus according to claim 1, wherein the processor calculates the color conversion precision through weighted computation in which, in the post-color conversion image, a relatively large weight is given to a region of interest and a relatively small weight is given to a region of no interest.

15. The image processing apparatus according to claim 1, wherein the processor calculates the color conversion precision through weighted computation in which, in the post-color conversion image, a relatively large weight is given to an important region and a relatively small weight is given to an unimportant region.

16. The image processing apparatus according to claim 1, wherein the processor calculates the color conversion precision through weighted computation in which, in the post-color conversion image, a relatively large weight is given to a region with a relatively large amount of variations in color conversion and a relatively small weight is given to a region with a relatively small amount of variations in color conversion.

17. The image processing apparatus according to claim 1, wherein the processor compares the color conversion precision with the threshold using different thresholds for a region of interest and a region of no interest, in the post-color conversion image.

18. The image processing apparatus according to claim 1, wherein the processor compares the color conversion precision with the threshold using different thresholds for an important region and an unimportant region, in the post-color conversion image.

19. The image processing apparatus according to claim 1, wherein the processor compares the color conversion precision with the threshold using different thresholds for a region where an amount of change in color conversion is relatively large and a region where an amount of change in color conversion is relatively small, in the post-color conversion image.

20. A non-transitory computer readable medium storing a program causing a computer to execute a process comprising:
generating a post-color conversion image from a pre-color conversion image using a color conversion model;

calculating a color conversion precision of the post-color conversion image using a precision of the color conversion model;
specifying a region where the color conversion precision is equal to or less than a threshold; and
displaying, among post-color conversion images, a post-color conversion image in which the region where the color conversion precision is equal to or less than the threshold has a size that is larger than a criterion determined in advance.

* * * * *